United States Patent [19]

Ryder

[11] 4,151,236

[45] Apr. 24, 1979

[54] METHOD FOR MOLDING MATERIALS

[76] Inventor: Leonard B. Ryder, 5 Sharon Dr., Whippany, N.J. 07981

[21] Appl. No.: 691,091

[22] Filed: May 28, 1976

Related U.S. Application Data

[63] Continuation-in-part of Ser. No. 628,670, Nov. 4, 1975, abandoned, which is a continuation-in-part of Ser. No. 498,959, Aug. 20, 1974, Pat. No. 3,937,609.

[51] Int. Cl.² ............................................. B28B 7/04
[52] U.S. Cl. ......................................... 264/39; 249/79
[58] Field of Search ....................... 264/37, 39; 249/79

[56] References Cited

U.S. PATENT DOCUMENTS

| 3,233,416 | 2/1966 | Rainwater et al. | 264/99 |
| 3,789,093 | 1/1974 | Bose | 264/37 |
| 3,930,779 | 1/1976 | Farrell | 425/242 |

Primary Examiner—Robert F. White
Assistant Examiner—James R. Hall

[57] ABSTRACT

An improvement in the method of operating a molding apparatus for use in molding plastic and other materials is provided. The inner mold surfaces of the apparatus are flooded, during operation, with a dehumidified gas such as dry air to minimize condensation of moisture onto these surfaces. This dry air forms a field in the area of the mold surfaces to keep out the normally moist ambient air. The field is exhausted and recirculated to the supply source where it is regenerated and returned to the area of the mold surfaces. In this way, a continuous concentration of dry air is maintained in contact with the mold surfaces. One or more dry air curtains are also established around the dry air field to prohibit moist air from entering the field. The air curtain may be established from the same supply source as the dry field or from a separate source and may also be recirculated. A cloud of dry gas may be emitted outside of the air curtains to further inhibit the flow of moist ambient air to the mold surfaces.

1 Claim, 12 Drawing Figures

METHOD FOR MOLDING MATERIALS

This application is a continuation-in-part application of Ser. No. 628,670 filed, Nov. 4, 1975 entitled Method for Molding Materials now abandoned which is a continuation-in-part application of Ser. No. 498,959 filed, Aug. 20, 1974 entitled Method and Apparatus for Molding Materials now U.S. Pat. No. 3,937,609, issued Feb. 10, 1976.

FIELD OF INVENTION

This invention relates to a method for molding materials and more specifically, to a method providing a dehumidified air field and a dehumidified air curtain surrounding the area of mold surfaces in an extrusion molding or injection molding apparatus.

DESCRIPTION OF PRIOR ART

Blow molding of plastics to form containers of various shapes for a wide number of industries has fast become the most conventionally acceptable method of forming plastic containers of all kinds. In a typical injection blow molding apparatus, a plastic parison which has been formed over a core rod is positioned between mold sections of a desired configuration, air is introduced through the internal portion of the core rod and the parison is blown outwardly away from the core rod and against the internal surfaces of the mold sections. The blown article is shaped and cooled by its contact with the inner mold surfaces. After sufficient cooling, the molds are opened and the core rod with the blown container is moved to a stripping station where the container is removed from the core rod. While this particular method and others of the same general type have been found to be fairly commercially feasible, there are a wide number of problems remaining to make this and similar methods most economical in producing the highest quality product.

One of the important factors in determining a high production rate using a process of this type is to obtain the lowest feasible mold temperature during the molding and cooling step. Generally, speaking, the lower the mold temperature, the faster is the rate of heat removal from the plastic and therefore the higher the production rate of the products through the apparatus. In the present state of the art the lowest level to which the mold surface temperatures could be reduced is governed by ambient air conditions in contact with the mold surfaces. In cooler winter climates the moisture content of the air (dew point) is sufficiently low to permit operation at mold temperatures in the 40° F.–50° F. temperature range without having moisture condense out of the air and onto the inner surfaces of the mold. Condensation of moisture on the inner mold surfaces is referred to conventionally as "mold sweating". If such mold sweating occurs to an objectionable degree, the part being molded will have surface defects. Naturally, in the more humid, hotter climate areas this particular problem is a more difficult one to overcome because of the higher air moisture content. In this type of climate the lowest practical mold temperatures are usually in the 60° F.–70° F. range.

There have been a number of attempts made in the industry to eliminate mold sweating as an impediment to high production rates. Efforts such as air conditioning the entire production area in which the mold is operating are only partially successful in eliminating the moisture content from the air in the area of the mold surfaces and more importantly, are not economical in terms of the results achieved. It is the primary object of this invention, therefore, to provide a method whereby a concentration of dehumidified gas is provided in the area of the mold surfaces in a practical and economical way so as not to increase the cost of production beyond a certain minimum level.

It is another object of this invention to provide a method whereby a concentration of dehumidified gas is supplied in the area of the mold surfaces and is recirculated through the supply source so as to provide an economical means of eliminating mold sweating.

It is still another broad object of this invention to provide a method whereby mold surface temperatures may be maintained at very low temperatures and still not experience any mold sweating.

BRIEF DESCRIPTION OF THE INVENTION

Broadly, the objects of the invention are satisfied by a method for molding materials in which moisture build-up on the mold surfaces of a molding apparatus is inhibited, comprising the steps of supplying a stream of dehumidified gas in the vicinity of at least one of the molding surfaces to provide a dry gas curtain, and supply dehumidified gas between the curtain and at least one mold surface and directly onto the surface to form a dry gas field within the curtain. The curtain keeps moist ambient air from contacting the mold surface while the dry field floods the surface within the curtain. Thus the combination maintains the mold surfaces in a dry condition. A dry gas cloud may also be provided outside of the curtain to further inhibit ambient air from penetrating to the mold surfaces.

In one embodiment, gas is continuously supplied through the peripheral area between opposing mold surfaces to provide a curtain of dry gas surrounding the mold surfaces. A supply of dehumidified gas is provided within the dry curtain to flood the mold surfaces and establish a dry field within the curtain. In one preferred embodiment, the dry gas is recirculated and regenerated through the supply source so that an economical closed system is employed. Preferably, two separate supply sources are used. One supply source such as a conventional air conditioner supplies the curtain while a second source such as a desiccant drying means supplies the dry field. In such a system, two separate closed loops are provided for recirculating the dry gas from the two supply sources.

An apparatus useful in carrying out the method of the invention includes a mold in which there is provided a first and second mold section each having a mold surface which is adapted to partially enclose and contact the material to be molded. These sections which are in a desired configuration for providing an end article of a particular shape, are adapted to be joined together to form a unitary mold area at the mold surfaces. One of the mold sections is provided with a casing forming a hollow chamber proximate the mold surface. The chamber has an opening which communicates with the space surrounding the mold surfaces. A gas supply means is connected to the chamber and supplies a continuous stream of dehumidified gas into the chamber under positive pressure. This gas is passed through the opening in the mold section and into the region immediately contiguous with the mold surfaces thereby setting up a dehumidified gas field in contact with the molding surfaces. Supplying a dehumidified gas through the mold section itself immediately into contact with the mold surfaces enables a concentration of dehumidified gas to be maintained and this allows an economical way of purging the moisture filled air in the vicinity of the mold surfaces during the operation of the mold.

In the preferred embodiment, the other mold section is also provided with a casing having a hollow chamber surrounding the mold surface. This casing is provided with an intake opening proximate the mold surfaces for receiving the dehumidified gas from the gas field and an exit orifice for exhausting the gas from the second chamber. Exhaust means is connected to the second chamber and draws the gas from the gas field through the second chamber. This exhaust means is also connected to the supply source so that the dry gas is returned to the source, reconditioned, and once again supplied to the first chamber. This provides an economical means of supplying a continuously recirculated, recycled dry gas into the region immediately in contact with the mold surfaces. As a result of this, the dew point immediately in the area of the mold surfaces is very low and the mold surfaces may be reduced to a very low temperature without worrying about moisture condensing on the mold surfaces. In order to enhance the supply of dehumidified gas to the dry gas field, a plurality of openings may be provided in the casing of the first mold section to permit the dry air to flow more evenly into the area.

The method of the present invention further includes the provision of a continuous stream of dry gas, preferably dry air, to form a curtain surrounding the dry gas field. In one manner of accomplishing this, an annular slot is placed in the first casing in a position so that it surrounds the molding surface and communicates with the chamber. The slot is therefore positioned about the periphery of the gas field and is substantially in registration with the intake opening in the second casing. The gas supply source and the exhaust means cooperate to pass the dry gas not only out of the openings in the casings into the gas field as above described but also through the annular slot and into the intake opening of the second chamber thereby to form a continuous curtain of dehumidified gas surrounding the gas field. With this construction, a continuous curtain of dry gas is maintained around the gas field to prevent moisture filled air from penetrating into the area of the gas field. As a result, the mold surfaces are further prevented from experiencing condensation during the operation of the mold. For even greater efficiency in the operation of the mold system, a second annular slot is positioned in the first casing surrounding the first annular slot and cooperating with the intake opening of the second casing to provide still another air curtain surrounding the first air curtain. In this construction, a double air curtain is provided around the gas field. Turbulence is avoided when the gas is passed through the annular slots described by forming these slots with arcuate shapes at every substantial change of direction of the slots.

In still another embodiment, individual streams of dry gas are forced across each mold surface from an emitter to a receiver. The direction of stream flow is substantially perpendicular to the direction of movement of the mold surfaces toward and away from each other during the operation of the apparatus. In this way, individual parallel streams of dry gas are formed in front of each mold surface. A dry field may also be established within each curtain.

While the dry gas field may be continuously supplied, it may be preferable to pulse compressed dry air into the area near the mold surfaces during the period when the mold sections are opening. It is during this period that a partial vacuum is created and this may tend to draw ambient air through the curtains. An automatic timer may be employed to release dry gas within the curtain during this period to offset the vacuum and flood the area.

The gas supply sources may be any one of a number of a possible dry gas sources. As one example, a conventional air conditioner may be connected to the first chamber and dry air is supplied into the area of the mold surfaces. In this system, the exhaust means may be a conventional return line which connects with the second chamber and draws the dry air from the field through the second chamber and out back to the air conditioner where it is reconditioned and then recirculated back to the first chamber. Alternatively, the air conditioner may be used to supply the air curtain separately from the supply source used to supply the field. Also in this system as well as in any other gas supply system, a reheater may be positioned between the air conditioner and the chamber to heat the output flow of air from the air conditioner prior to the entry thereof into the first chamber. The reheater permits the mold surfaces to be maintained at a temperature level much below 40° F. and still there will be no condensation of moisture on these mold surfaces. Since the dew point of the dry air coming from the air conditioner is normally such that condensation will occur at 40° F., heating the dry air to a temperature of up to 120° F. means that there will not be any possibility of this heated dry air being lowered to below 40° F. as it passes onto the mold surfaces since the time of passage through the system is so rapid. As a result, the mold surfaces may be maintained at a temperature much below 40° F. and no mold sweating will occur.

Still another supply of dry gas which is sometimes capable of reducing the dew point to as much as minus 40° F. is a system including desiccant dryers utilizing absorbents such as molecular sieves. Other desiccant systems employing materials such as silica gel or activated alumina are also quite successful in a system of this type. Since a system of this type is sometimes capable of reducing the dew point of the dry gas supplied to as much as minus 40° F., the mold operating temperatures can thereby be lowered very substantially e.g. into the plus 35° F. range, and higher production rates are therefore possible due to the faster cooling of the plastic in the colder mold. For this reason it is quite desirable to use this type of supply source to supply the dry field within the air curtain since dryer air may be supplied and maintained in the critical region of the mold surfaces. Still other gas supply sources are possible in the apparatus of the invention. As another example, the use of sub zero air supplied by special industrial refrigeration equipment which dries air to sub zero temperatures by freezing rather than condensation permits dry air to be supplied at a dew point which is also very low.

The objects of the invention will become more apparent from the following detail description taken in conjunction with the accompanying drawings in which.

DETAIL DESCRIPTION OF THE DRAWINGS

Figure 1:
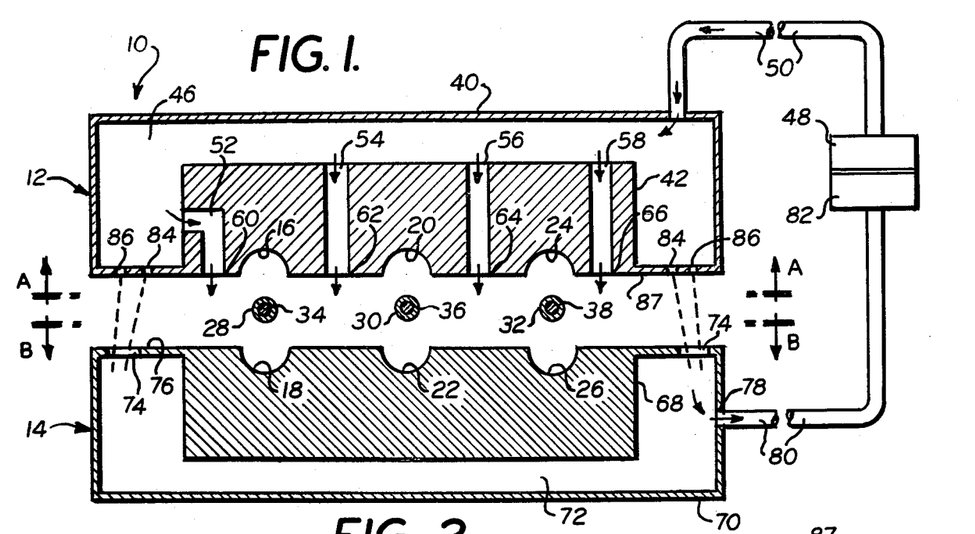
FIG. 1 is an elevational view in section of the molding apparatus of the invention.
Figure 2:
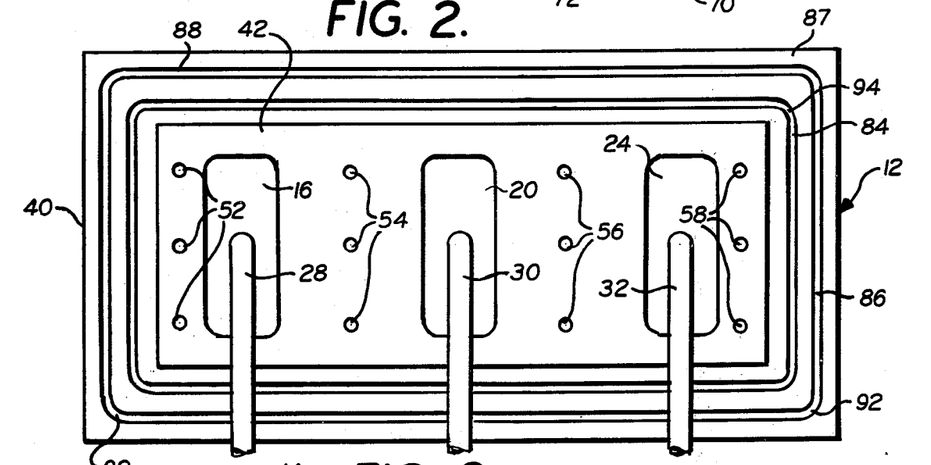
FIG. 2 is a plan view taken on line A—A of FIG. 1 illustrating the upper half of the mold apparatus.

Referring now to FIGS. 1 and 2, there is illustrated generally by the numeral 10 a molding apparatus useful in molding material such as plastic. The apparatus 10 is shown to have two molding sections 12 and 14 in a spaced apart position. Each of the molding sections 12 and 14 are shown having molding surfaces 16 and 18 oppositely positioned from each other and adapted when the mold sections are joined together to form a singular mold area at the molding surface. FIG. 1 also shows other cooperating mold surfaces 20 and 22 and 24 and 26 which similarly join together to form a mold area. Plastic parisons 28, 30 and 32 are shown in position just prior to the mold sections closing thereupon. These plastic parisons are positioned around core rods 34, 36 and 38 respectively. In the operation of this particular blow molding apparatus, the mold sections 12 and 14 are joined together and the mold surfaces enclose the parisons 28, 30 and 32. Air is then blown through the core rods 34, 36 and 38 and the parisons are expanded into contact with the mold surfaces. The parisons then assume the configuration of the mold surfaces and a container of a desirable structure is formed. The containers are then removed from the core rods at a stripping station (not shown).

As shown best in FIGS. 1 and 2, the mold section 12 includes a casing 40 and a mold part 42. The mold part 42 includes the molding surfaces 16, 20 and 24 which are the surfaces coming in contact with the parisons and on which mold sweating is to be avoided. The casing 40 defines a hollow chamber 46 surrounding the mold part 42 into which a dehumidified gas such as dry air is fed from supply source 48 through conduit 50. A plurality of channels 52, 54, 56 and 58 are formed in the mold part 42 and serve to communicate with chamber 46 so as to receive the dry air from the chamber and pass it out of openings 60, 62, 64 and 66 respectively into the area immediately contiguous with the molding surfaces.

In operation, the dehumidified air is passed under positive pressure from source 48 through supply line 50 and into chamber 46. As the dry air is continuously supplied, chamber 46 is filled and the dry air then passes through channels 52, 54, 56 and 58. These channels are formed directly in the mold part 42 so that the dry air floods the area immediately in front of the molding surfaces 16–26 and displaces any moisture filled air in the vicinity thereby setting up a dry air field. The dew point of the dry air is substantially lower than that of moist air and thus the mold surfaces may be brought to a lower temperature because of the high concentration of dry air. To improve the degree of concentration and to improve the movement flow of the dry air, the channels 52, 54, 56 and 58 may be arranged as shown in FIG. 2, that is, a plurality of vertically arranged individual channels all supplying dry air to the dehumidified air field in contact with the molding surfaces.

The effectiveness of the mold apparatus thus far described is even more enhanced by providing an exhaust system to remove the dry air field so that a continuous flow of a fresh supply can be maintained, a recirculation system to economically recirculate the dry air, and a dry air curtain to surround the air field and further prevent moisture from condensing on the molding surfaces by penetration of moist air into the dry air field. Referring again to FIG. 1, the mold section 14 comprises a mold part 68 which supports the molding surfaces 18, 22 and 26, and a casing 70 which surrounds the mold part 68 and defines a hollow chamber 72. An annular opening 74 (best shown in FIG. 3) positioned in the front face 76 of the casing 70 functions as an intake opening for the dry air to flow into chamber 72. An exit orifice 78 in the casing permits the moving dry air to exit from the chamber and into conduit 80. An exhaust device, such as a fan, blower or the like, illustrated schematically and designated by the numeral 82 draws the dry air under pressure through the cycle just described and also feeds the exhausted dry air to conditioner 48 where it is reconditioned for a return to chamber 46. With this arrangement, a very economical means of preventing mold sweating from occurring in a single mold or in several molds simultaneously is provided, through the use of relatively small quantities of "conditioned" and recirculated dry air.

As illustrated in FIGS. 1 and 2, a pair of substantially concentrically arranged annular slots 84 and 86 each form an opening in the front face 87 of casing 40 and communicate with chamber 46. These annular slots effectively surround the molding surfaces and the dry air field established as above described. Because they are in communication with the chamber 46, the dry air fed from source 48 also passes out of slots 84 and 86. The velocity of the dry air under pressure is such that the dry air directly crosses the gap between mold sections 12 and 14 and is absorbed into the intake opening 74. The cooperation of the supply pressure and the exhaust pressure causes two streams or curtains of dry air to be formed between slots 84 and 86 and intake opening 74 as shown by the dotted lines in FIG. 1. The double air curtain which is formed substantially reduces the possibility of penetration of outside moist air into the area of the dry air field within the double air curtain. A non-turbulent flow of air to form the air curtains is made possible by rounding the slots 84 and 86 at every substantial change in direction of the slots such as shown by numerals 88, 90, 92 and 94 in FIG. 2. Additionally, the slots 84 and 86 may be slightly offset relative to, although still maintained in substantial registration with, intake opening 74 so that the air curtains formed are in effect sweeping slightly outward so as to also sweep outward moist air attempting to penetrate into the dry air field. It has been determined that the width dimension of the slots may be about 0.08 inches and the velocity of air through these slots may be about 8-10 feet per second for an excellent and continuous curtain to be established. Obviously, more or less air curtains may be used depending upon environmental conditions, economics of the system and other considerations.

Figure 4:
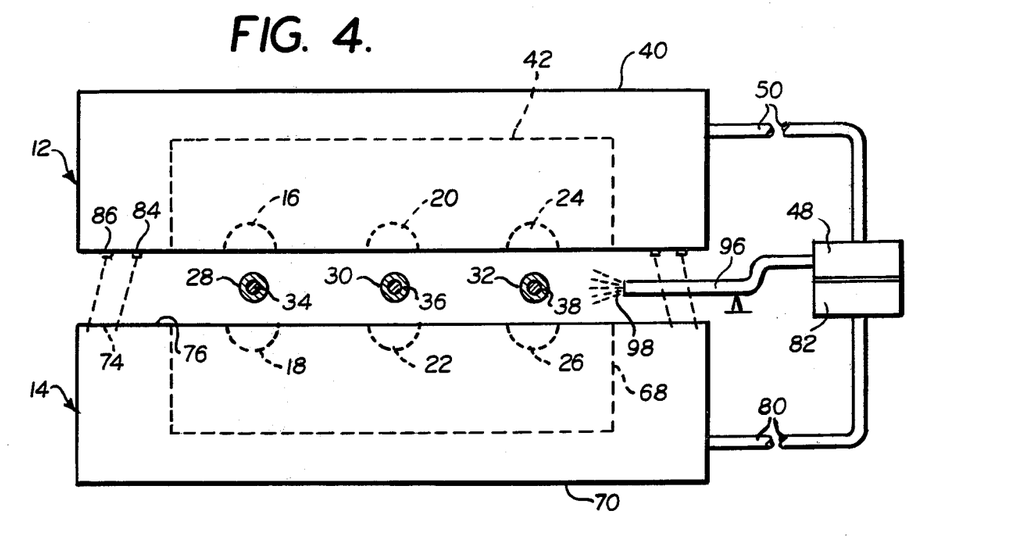
FIG. 4 is an elevational view of another embodiment of the apparatus illustrated in FIG. 1.

Supplying dehumidified gas to the field within the curtains through the mold apparatus has already been described with reference to FIG. 1. Referring to FIG. 4, an alternate manner of supplying dehumidifed gas to the dry air field from sorce 48 is illustrated. A conduit 96 which may be a pipe, hose or other type of gas supply line, is connected directly to the source 48 and penetrates through the double dry gas curtains shown by dotted lines. The end opening 98 on the conduit 96 supplies a stream of dry gas into the area surrounded by the dry gas curtains and thereby establishes the gas field in contact with the mold surfaces. This gas field is vented through opening 74 in casing 70 and is recirculated through the system as described with reference to FIG. 1. Both in this embodiment and that shown in FIG. 1, the dry gas field is swept into opening 74 preferably at a rate of about two field changes per minute within the gas curtains. While only one conduit 96 is shown, any number of such conduits may be similarly connected in the system. With a plurality of such conduits, a heavier concentration of dry gas may be formed within the curtains in a shorter time, thus enhancing the value of the system even more.

Figure 5:
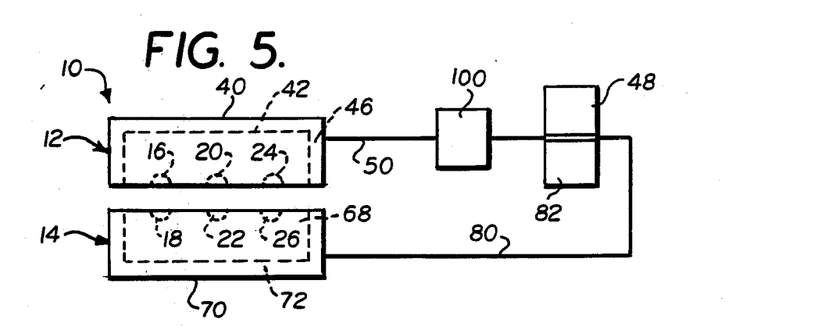
FIG. 5 is a schematic view showing the apparatus of the invention with a particular type of supply source.

The particular source of dry gas or dry air selected may vary depending upon the molding apparatus employed, the environmental conditions and other factors. An excellent and economical source is a conventional air conditioner system with a return duct arrangement connected as shown in the drawings. Since the best dew point temperature obtainable with this type of source is about 40° F., an improved system is provided by the insertion of a preheater 100 as shown schematically in FIG. 5. The preheater 100 heats the dry air flowing from air conditioner 48 to a temperature as high as 120° F. if desired before it reaches chamber 46. The mold surfaces 16-26 may be cooled by some cooling means (not shown) to a temperature well below 40° F. The high temperature dry air will be cooled as it passes through the mold apparatus but is not cooled fast enough to lower the temperature of the gas below 40° F. before it completely passes through the apparatus. Thus no moisture will condense out and yet the molds are kept at a very cold temperature below 40° F. as desired.

Figure 6:
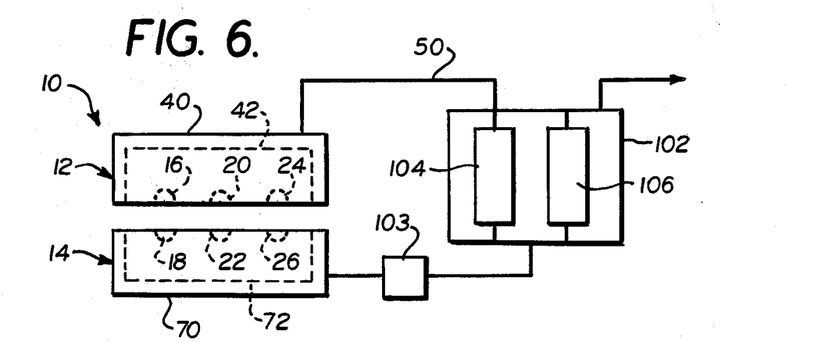
FIG. 6 is another schematic illustration of the apparatus of the invention illustrating another gas supply source.

A particularly good supply source illustrated schematically by the numeral 102 in FIG. 6 is a dryer employing molecular sieve absorbent drying beds or similarly effective desiccants. Several molecular sieve adsorption beds 104, 106 may be employed with associated heating and cooling equipment (not shown) to adsorb moisture from the gas being circulated. One bed can be adsorbing while the other is regenerating. Type 4A LINDE molecular sieve which is the type used for static dehydration in a closed gas system is one example of a suitable desiccant which may be used in the subject invention. The use of a desiccant drying system enables the dew point to be greatly lowered, thereby permitting the molds to be cooled to low temperatures without condensation occurring. Other desiccants such as silica gel and alumina may also be used but molecular sieves are preferred because of their very high capacity for adsorption of water. A typical desiccant dryer 102 is the FOREMOST Dryer manufactured by FOREMOST Machine Builders, Inc. of Fairfield, N.J. and is described in Bulletin 390-A of that company. A precooler 103 such as a conventional air conditioner may be placed in the return line before the desiccant dryer 102 to dehumidify the returning dry gas flow. This relieves the dryer 102 to some degree in the event that the returning gas has absorbed excessive moisture from the ambient air.

Another supply source which may be used for source 48 in FIG. 1 is a sub zero air refrigeration system which dries air to a sub zero dew point by freezing rather than condensation. Such a refrigeration unit is commercially available from the manufacturer, Peuchen, Inc. of Wilmington, Del. Furthermore, dry bottled gas such as nitrogen or carbon dioxide may also be successfully employed in the present invention.

The apparatus illustrated in FIGS. 1-6 are representative of suitable arrangements to implement the method of the invention. However, the method could of course be used with other arrangements. As an example, it may be desirable to pass the dry air for the dry field as well as for the curtain directly into an enclosure surrounding the molds instead of passing it through the mold sections. As another example, in the apparatus thus far described or in other arrangements, two separate supply sources may be used to further ensure that very dry gas reaches the mold surfaces. Since the curtain which is formed is exposed to the moist air at the periphery of the mold, it is continuously absorbing moisture. Thus when it is recirculted to the supply source it must be reconditioned and may in some instances place a heavy load on the conditioner causing some loss in efficiency. The embodiment shown in FIG. 7 results in an improved system since two sources, air conditioner 48 and desiccant dryer 102 are used.

Figure 7:
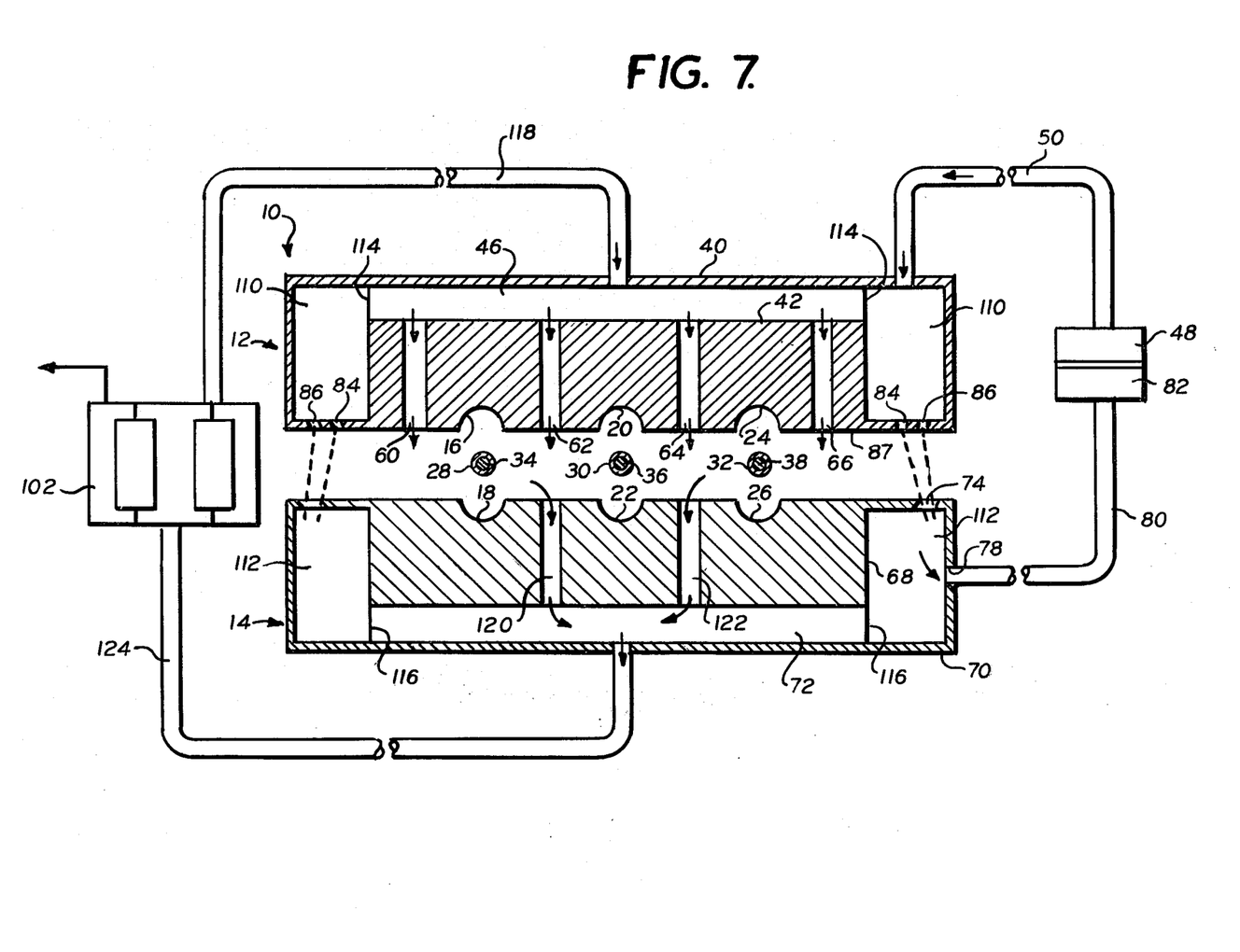
FIG. 7 is an elevational view of still another embodiment of the apparatus illustrated in FIG. 1.

Referring to FIG. 7, air conditioner 48 feeds dry air through supply line 50 to chamber 110 under positive pressure and the air passes out of slots 84 and 86 to intake opening 74 to form air curtains as before described. Chamber 112 receives the air from the curtain and the air passes through opening 78 being drawn by blower 82 through conduit 80 back to the conditioner 48. Thus the air curtains are maintained in a closed loop supplied by conditioner 48. Partition 114 separates chamber 110 from chamber 46 while partition 116 separates chamber 112 from chamber 72 thereby isolating the closed system including conditioner 48 from supply source 102 and the dry field set up by dryer 102. The desiccant dryer 102 supplies dry gas to chamber 46 through supply line 118 and this gas passes through channels 52, 54, 56 and 58 as described with reference to FIG. 1. The dry field established in the area of the mold surfaces 16-26 is exhausted through channels 120 and 122 instead of through opening 74. The gas is drawn by a blower or the like (not shown) through chamber 72 and back to the desiccant dryer 102 through conduit 124. Thus it can be seen that a second closed system including dryer 102 is formed and that this system supplies the dry field while isolated from the system supplying the curtains. With this arrangement, the field is maintained in a very dry condition since it is isolated from the somewhat moist curtains thereby relieving the load on each of the sources and providing very effective results.

Figure 8:
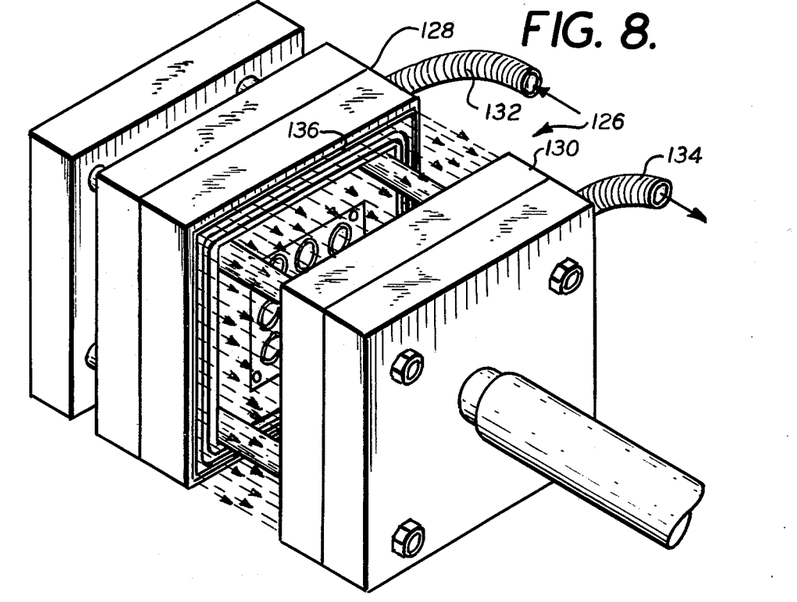
FIG. 8 is a pictorial view of an injection mold apparatus useful in the present invention.
Figure 9:
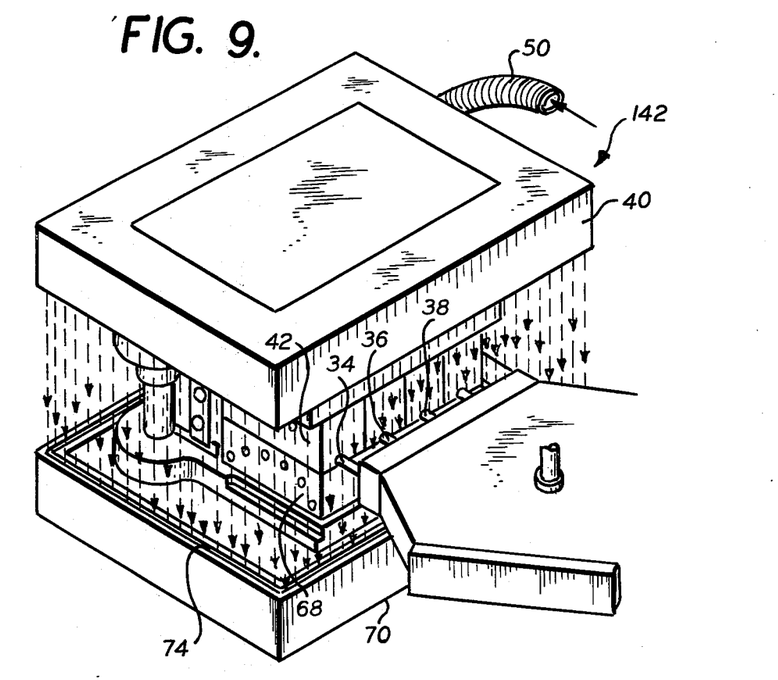
FIG. 9 is a pictorial view of an injection blow mold apparatus useful in the present invention.
Figures 10, 11, 12:
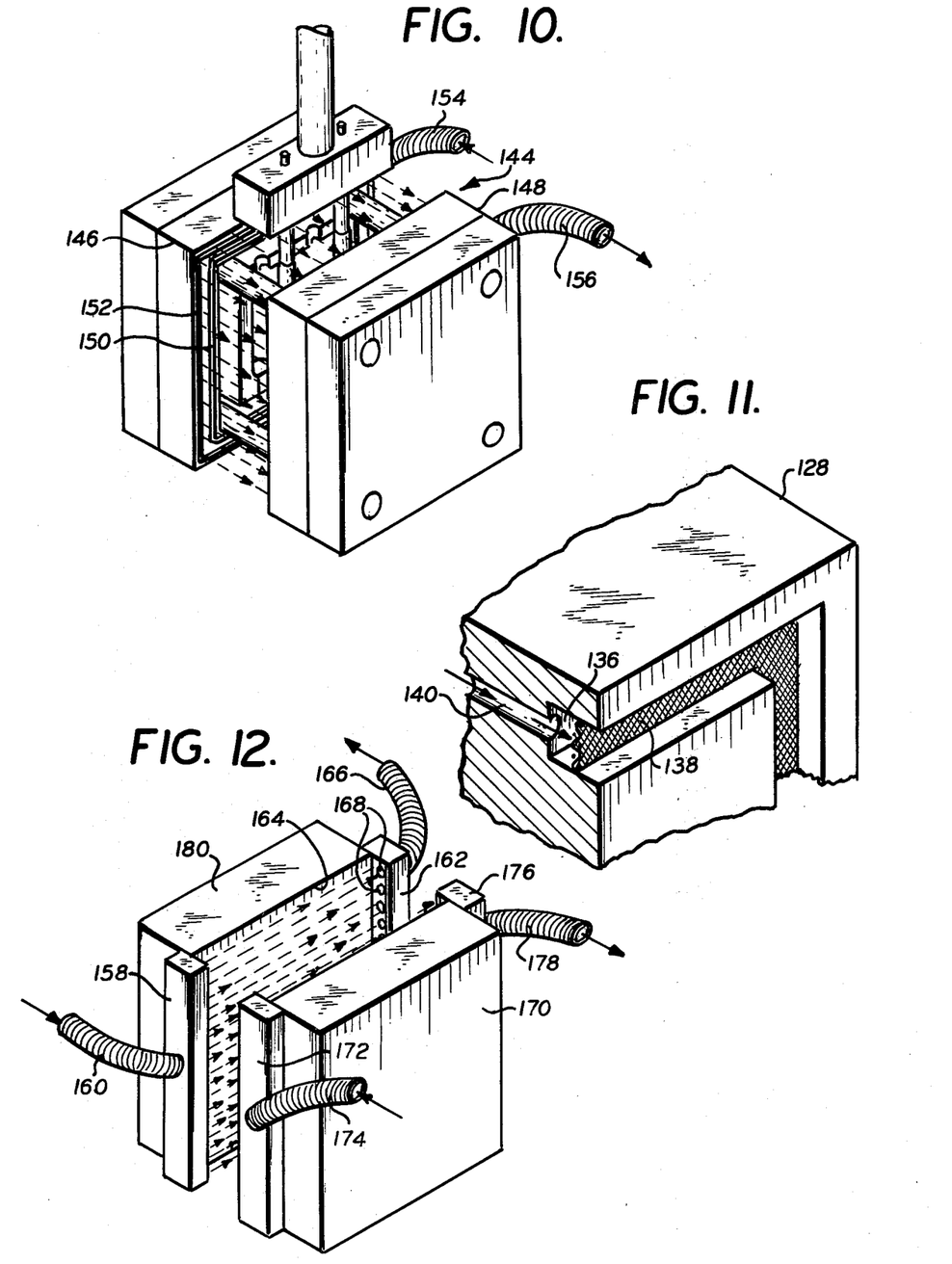
FIG. 10 is a pictorial view of an extrusion blow mold apparatus useful in the present invention.
FIG. 11 is an exploded view of a part of any of the apparatus in FIGS. 8, 9 or 10 illustrating a cloud generating means.
FIG. 12 is a schematic illustration of an apparatus for establishing air curtains in an alternate manner.

FIGS. 8 through 11 illustrate the use of a cloud generating means in various apparatus which may typically be employed in the subject invention. FIG. 8 illustrates an injection molding apparatus 126 having two mold sections 128 and 130. Supply line 132 provides dry gas to an internal chamber (not shown) in section 128 while exhaust line 134 returns the gas for regeneration. Dry gas curtains and dry field may be established in this apparatus as explained with reference to FIGS. 1–7 herein. It will be noted that a cloud of dry air is indicated by a plurality of arrows directed from section 128 to section 130. This cloud is generated outside of the air curtains and mold surfaces to further ensure that ambient air does not penetrate to the mold surfaces within the apparatus. Actually the cloud is a slow velocity stream of dry gas which may be supplied from the same supply sources as the dry field and curtain. A peripheral groove or channel 136 is placed in section 128 and the dry gas is emitted from this channel. This is best illustrated in FIG. 11. As shown in FIG. 11, a fine mesh screen 138 is positioned in groove 136 and breaks the velocity of the dry gas flowing therethrough. The dry gas is passed through channel 140 which communicates with a chamber (not shown) behind section 124 and then through screen 138. Section 130 is provided with an inlet opening (not shown) such as that illustrated in FIG. 1 by the numeral 74.

Figure 3:
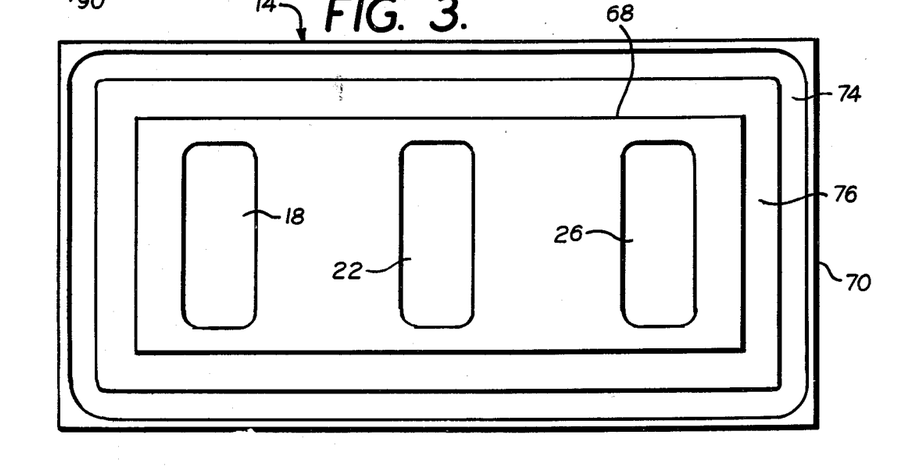
FIG. 3 is a plan view taken on line B—B on FIG. 1 illustrating the other mold section of the apparatus shown in FIG. 1.

FIG. 9 shows an injection blow molding machine 142 which is similar to that shown in FIGS. 1–3. This illustration pictorially shows the various elements described with reference to FIGS. 1–3 and although the apparatus is somewhat different than that of the earlier figures, similar elements have been similarly numbered for reference purposes. It will be noted that opening 74 receives the dry gas from the formed cloud and may also receive the dry gas from air curtains and dry field, if desired.

FIG. 10 illustrates an extrusion blow molding apparatus 144 to which the process of the invention is also applicable. This apparatus includes sections 146 and 148 into which the emitting curtain slot 150 and receiving slot (not shown) are formed. Channel 152 is a cloud generating means such as shown in FIG. 11. Supply conduit 154 and return conduit 156 operate in conjunction with a dry gas supply as hereinbefore described.

FIG. 12 schematically shows an alternate method of establishing dry gas curtains adjacent individual mold faces. In FIG. 12, an emitter 158 emits a high velocity stream of dry gas supplied through conduit 160 toward receiver 162. The stream travels across mold face 164 and protects it from ambient air. A conduit 166 is employed to return the dry gas at receiver 162 to the supply source for regeneration. A plurality of openings 168 may be placed in both emitter 158 and receiver 162 to provide a dry field within the curtain and onto the mold face 164. In this way, mold face 164 is provided with its own curtain and dry field independently of the other mold face. A second dry field and air curtain combination may be provided at the mold face (not shown) in mold section 170. To this end an emitter 172, conduit 174, receiver 176 and conduit 178 cooperate to set up an independent, substantially parallel, air curtain to that established in the opposite mold section 180. These curtains are passed in a direction perpendicular to the movement of sections 170 and 180 toward and away from each other unlike the peripheral curtain described with reference to FIG. 1.

While FIG. 12 schematically illustrates the apparatus which may be employed to establish individual gas curtains adjacent individual mold faces, it is apparent that any number of appropriate mechanisms may be employed to secure emitters 158 and 172 and receivers 162 and 176 to mold sections 170 and 180. It is further apparent to anyone skilled in the molding art that such emitter and receiver on one mold section would be offset or otherwise positioned relative to its counterpart on the other mold section so that the mold faces may abut during mold closure.

All of the molding apparatus described include sections which move away from each other after the molding or blow molding has been completed. Such a motion may tend to cause a vacuum or suction in the area of the mold faces, thus tending to pull ambient air through the curtains. This may be counteracted by pulsing or otherwise supplying compressed dry gas into this area as soon as the mold sections begin to part. The compressed gas which thus forms the dry field provides a sufficient pressure to overcome the suction force and inhibits the flow of ambient air. A conventional timing mechanism may be set to release the dry gas from the supply source at the instant the molds separate and continue the release until the molds are fully parted or until closure of such molds are again effected in the molding cycle.

From the foregoing, it will be appreciated that the methods of the invention provide an economical solution to increasing production rates in a molding apparatus while simultaneously improving the quality of the product produced. The subject invention effectively eliminates mold sweating at a small cost and results in a substantial cost saving to the manufacturer through substantial production increases.

It will be appreciated that other modifications may be made without departing from the scope of this invention.

What is claimed is:

1. In a method for molding a plastic article wherein the condensation of moisture from ambient humid air is minimized upon the face of mold sections which have been cooled, prior to molding, to a temperature below the dew point of said humid air, comprising:
 (a) positioning opposite each other in a spaced apart relationship cooled first and second mold sections each having a mold face,
 (b) moving said first and second mold sections toward each other to enclose a mass of heated plastic material which is introduced between said mold faces,
 (c) forming said heated plastic material against said opposed mold faces to shape said plastic material thereto,
 (d) cooling said plastic material by contact with said cooled mold sections,
 (e) moving said first and second mold sections apart,
 (f) removing said molded plastic article,
 the improvement comprising, whenever said mold sections are in a spaced apart relationship,
 directing continuously across the face of each of said first and said second cooled mold sections separate streams of dehumidified gas in a direction perpendicular to the direction of movement of said mold sections to form first and second curtains respectively of said gas immediately adjacent the face of each of said first and second mold sections to inhibit said humid air from contacting said cooled mold section faces and to thereby minimize the condensation of moisture upon said mold faces, wherein the directing of said streams is effected by an emitter means operatively connected to each of said first and second mold sections and effective to direct said streams at a velocity sufficient to flow said streams across the mold section faces and a receiver means operatively connected to each of said mold sections and effective to receive said gas streams being directed from said emitter means.

* * * * *